July 31, 1934.   C. P. GALANOT   1,968,445
GATE OPERATING MECHANISM
Filed March 13, 1930
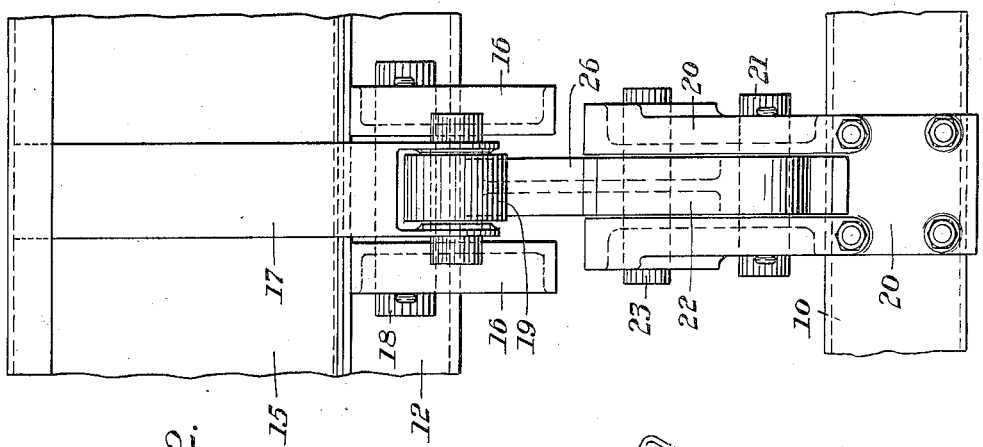
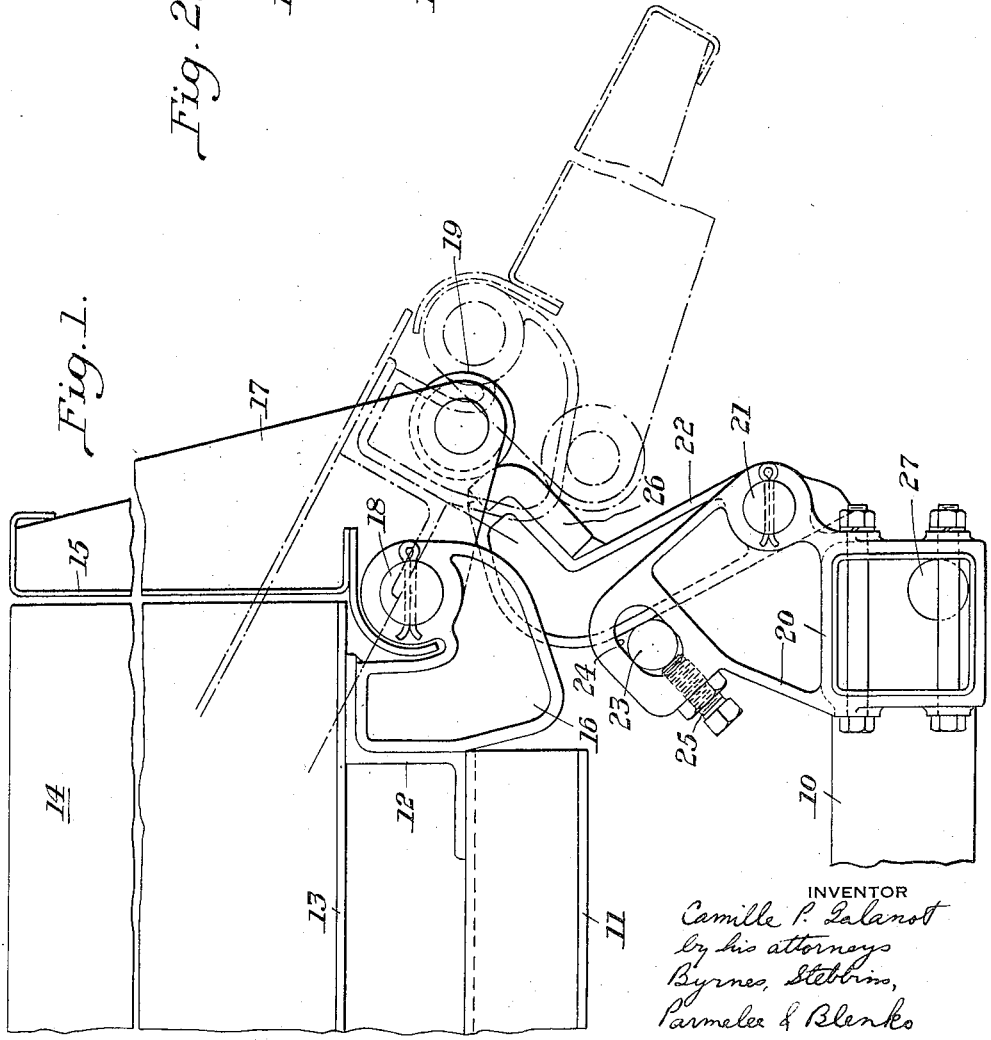
INVENTOR
Camille P. Galanot
by his attorneys
Byrnes, Stebbins,
Parmelee & Blenko Patented July 31, 1934

1,968,445

UNITED STATES PATENT OFFICE 1,968,445

GATE-OPERATING MECHANISM

Camille P. Galanot, Youngstown, Ohio, assignor to The Commercial Shearing & Stamping Company, Youngstown, Ohio, a corporation of Ohio Application March 13, 1930, Serial No. 435,459

7 Claims. (Cl. 298—23)

My invention relates to means for operating a pivoted gate on a tilting body of a vehicle.

I am aware that numerous types of gate-operating mechanisms have already been suggested for dumping vehicle bodies, but my experience has been that all such mechanisms are characterized by complication in construction and frequent failures in operation. In addition, the devices known heretofore required a large amount of space and have been expensive to manufacture.

I have invented a novel form of gate-operating mechanism which overcomes the foregoing objections. The invention contemplates a cam for operating a gate and, in particular, a down-folding gate which may be pivoted to the side or rear end of the dumping body. The arrangement is compact, the parts are small, and the construction is simple and inexpensive. The operation is reliable, and the device does not require the attention of the operator of the vehicle, but is fully automatic, causing the gates to open when the body is tilted, and to close when it is lowered.

According to the invention, I provide a dumping vehicle body with a down-folding gate pivoted adjacent the body bottom. The invention may be applied either to side gates or end gates of a body since the construction is practically identical for both applications. A downward projection is secured to the pivoted gate and a roller is journalled therein. Below the body bottom and preferably on one of the frame members of the vehicle, I place a bearing bracket. An arm is journalled in the bracket and means are provided for maintaining the arm in any desired position. A cam surface is formed at one end of the arm for engagement with the roller. The surface is so formed that, when the vehicle body is tilted, the roller will ride down the cam surface, permitting the gate to fall open. When the body is lowered to its normal horizontal position, the roller rides up the surface and forces the gate closed.

In order to insure that the gate shall be fully closed when the body is lowered to its level position, I make provision for adjusting the cam surface to vary the angle through which the gate is moved. It is thus possible to make adjustments so that the gate will always close properly and compensation for wear in the various members is also provided.

For a complete understanding of the invention, reference is made to the accompanying drawing which illustrates a present preferred embodiment of the invention:

Figure 1 is a side elevation of the gate-operating mechanism and a portion of the tilting body and frame of the vehicle of which it is a part; and Figure 2 is an end view of the structure of Fig. 1.

Referring in detail to the drawing, I have illustrated a portion of a vehicle chassis at 10. The member 10 may be one of the longitudinal channels of the chassis if the operating mechanism is to be applied to a rear gate. If the mechanism is to operate a side gate, the member 10 may conveniently be one of the transverse members for supporting the tilting body such as is illustrated, for example, in my copending application, Serial No. 411,777, filed December 5, 1929.

The member 10, through means not shown, affords a pivoted support for a tilting body having frame members 11 and 12, and a bottom 13. The side walls of the body are formed by the gates 14 and 15 which are pivoted adjacent the body bottom 13. The gate 15, for example, is pivoted in bearing brackets 16 secured to the frame member 12 of the body. The pivotal support for the gate 15 includes the downward projection 17, which is in the nature of a stiffening rib, and a pin 18 which passes through the bracket 16 and the projection 17.

Adjacent its outer end, the projection 17 is provided with a roller 19 journalled therein.

A bearing bracket 20 is secured to the frame member 10 and carries a pin 21 on which is journalled an arm 22. The arm 22 is maintained in position by means of a pin 23 passing through holes 24 in the upper portion of the bracket 20. A screw 25 is provided for adjusting the position of the pin 23 and the angle of adjustment of the arm 22.

A hardened steel insert 26 is carried on the arm 22 and provides a cam surface adapted to be traversed by the roller 19 on the gate 15 which acts as a cam follower. As shown in Fig. 1, the gate 15 is maintained in the vertical position by the engagement of the follower roller 19 with the cam member 26. Obviously, the initial position of the gate 15 may be controlled by adjusting the angularity of the arm 22 by means of the adjustment screw 25.

When the body is tilted by the hoist means, not shown, about some axis such as that indicated in outline at 27, the roller 19 will ride down the cam 26 and permit the gate to fall open as indicated in the chain lines in Fig. 1. Because of the design of the cam 26, the gate 15 will be practically wide open as soon as the body is tilted a few degrees. This permits a ready dumping of the contents of the vehicle without obstruction. As the body is lowered, the operation is reversed and the roller 19 rides up the cam 26 to close the gate 15. Figure 2 shows an end view of the gate-operating mechanism and it is to be understood that a plurality of cams and rollers may be employed to actuate a single gate, depending upon the length thereof and other considerations. In general, it will be satisfactory to employ two cams and rollers for rear gates and three for side gates.

If it is desired to lower the gate when the body is in its normal position, it is only necessary to withdraw the pin 23 from the holes in the casting 20. The arm is thereby permitted to assume a substantially horizontal position and the gate 15 may be raised or lowered independently of movement of the tilting body.

Since the hoist for the body and the tilting pivots are independent of the gate operating mechanism, I have not thought it necessary to illustrate or describe the former. For an understanding of the operation of the invention, it is only necessary to assume that the vehicle body tilts about an axis located at 27. As previously stated, this may be the axis for side dumping or for rear dumping.

It will be apparent from the foregoing description, that the invention provides a compact and simple arrangement for operating the gates of tilting vehicle bodies. The mechanism consists of but a few parts of small size. The design of the bracket 20 permits the force required to close the gates to be transmitted directly to the vehicle chassis and the various members of the mechanism are designed to transmit this force in the most effective manner.

Although I have illustrated and described hereinabove but a single present preferred embodiment of the invention, I do not intend to be limited to the specific details of construction illustrated since many changes therein may be made without departing from the spirit of the invention as set forth in the appended claims.

I claim:

1. In a vehicle having a dumping body with a down-folding gate, a cam mounted on an arm pivoted to the vehicle chassis, a roller on said gate adapted to engage said cam for opening and closing said gate when said body is tilted and lowered, and means for releasably holding said cam and arm in gate-operating position.

2. In a vehicle, a tilting body, a gate therefor, and means for operating the gate including an arm journaled in the vehicle frame, means for maintaining the arm in a predetermined adjusted position, and a cam surface on said arm for co-operating with a follower on said gate.

3. The combination with a tilting vehicle body, a gate pivoted thereto, a downward extension on said gate having a roller journaled therein, of a cam surface secured to the vehicle frame for actuating said gate as the body tilts, by engaging said roller, said cam being mounted on a pivoted arm, and removable means for holding the cam and arm in operative position.

4. In a vehicle having a tilting body, a bearing bracket secured to a chassis member of said vehicle, a substantially L-shaped arm pivoted in said bracket, a cam carried by said arm, an adjustable pin for positioning the arm relative to the bracket, and a door hinged to said body, said door having a roller cooperating with said cam.

5. Mechanism for operating a gate on a tilting vehicle body comprising an arm pivoted to the vehicle frame, means for adjusting the position of the arm, a cam surface on the arm, and a roller on the gate for traversing said surface on tilting of the body.

6. Mechanism for operating a gate on a tilting vehicle body including a bearing bracket carried on the vehicle frame, an arm adjustably journaled therein, a pin traversing the bracket forming an abutment for supporting said arm, means for adjusting the pin to position the arm, a cam surface on the arm and a gate on the body having a projection adapted to engage said surface.

7. Mechanism for operating a gate on a tilting vehicle body comprising an L-shaped arm pivoted adjacent one end to a fixed support, an adjustable abutment supporting the arm, an L-shaped cam surface seated on the other end of the arm, a gate pivoted to the body, and a roller on the gate for cooperation with said surface.

CAMILLE P. GALANOT.